(12) United States Patent
Meeker

(10) Patent No.: US 10,075,051 B2
(45) Date of Patent: *Sep. 11, 2018

(54) SERIES-WOUND HETEROPOLAR INDUCTOR MOTOR

(71) Applicant: Foster-Miller, Inc., Waltham, MA (US)

(72) Inventor: David C. Meeker, Natick, MA (US)

(73) Assignee: Foster-Miller, Inc., Waltham, MA (US)

( * ) Notice: Subject to any disclaimer, the term of this patent is extended or adjusted under 35 U.S.C. 154(b) by 138 days.

This patent is subject to a terminal disclaimer.

(21) Appl. No.: 14/992,210

(22) Filed: Jan. 11, 2016

(65) Prior Publication Data

US 2016/0276912 A1     Sep. 22, 2016

Related U.S. Application Data

(60) Provisional application No. 62/133,659, filed on Mar. 16, 2015.

(51) Int. Cl.
   *H02P 6/32*   (2016.01)
   *H02K 19/10*  (2006.01)

(52) U.S. Cl.
   CPC ............ *H02K 19/103* (2013.01); *H02P 6/32* (2016.02)

(58) Field of Classification Search
   CPC ................................ H02K 19/103; H02P 6/32
   USPC ..................................................... 318/400.11
   See application file for complete search history.

(56) References Cited

U.S. PATENT DOCUMENTS

| | | |
|---|---|---|
| 2,103,165 A | 12/1937 | Merrill |
| 2,427,920 A | 9/1947 | Morrison |
| 4,348,605 A | 9/1982 | Török |
| 4,949,021 A * | 8/1990 | Rozman .................. F02N 11/04 318/400.11 |
| 5,012,148 A * | 4/1991 | Vithayathil ............ H02K 19/12 310/162 |
| 5,528,445 A * | 6/1996 | Cooke ..................... B60L 3/003 361/18 |
| 5,598,091 A * | 1/1997 | Satake .................. H02K 19/28 310/180 |
| 5,677,605 A | 10/1997 | Cambier et al. |
| 5,866,964 A | 2/1999 | Li |
| 6,075,302 A | 6/2000 | McCleer |
| 6,150,791 A | 11/2000 | Fulton |
| 6,194,852 B1 * | 2/2001 | Lovatt .................. H02K 1/2726 318/400.02 |
| 6,204,587 B1 | 3/2001 | Török et al. |
| 6,242,834 B1 | 6/2001 | Akemakou |

(Continued)

FOREIGN PATENT DOCUMENTS

WO     2012073388 A1     6/2012

OTHER PUBLICATIONS

Written Opinion of the International Searching Authority for PCT Application No. PCT/US2016/013022 dated Mar. 3, 2016 (six (6) pages).

(Continued)

*Primary Examiner* — Kawing Chan
(74) *Attorney, Agent, or Firm* — Iandiorio Teska & Coleman, LLP

(57) ABSTRACT

An inductor motor includes a rotor with teeth and no windings and a stator including teeth, three phase windings, and at least one field winding. A three phase rectifier has an input connected to the phase windings and an output connected to the field winding.

17 Claims, 9 Drawing Sheets

(56) References Cited

U.S. PATENT DOCUMENTS

| | | | |
|---|---|---|---|
| 6,788,020 B1* | 9/2004 | Pollock | H02P 1/16 318/599 |
| 7,218,019 B2 | 5/2007 | Potter | |
| 8,004,127 B2 | 8/2011 | Potter | |
| 8,362,884 B2 | 1/2013 | Duge | |
| 8,499,544 B2 | 8/2013 | Shafer et al. | |
| 8,967,531 B2 | 3/2015 | Gagne et al. | |
| 9,041,232 B2* | 5/2015 | Shah | H02K 19/24 290/1 A |
| 9,293,952 B2* | 3/2016 | Meeker | H02K 19/20 |
| 2006/0066153 A1* | 3/2006 | Klercker Alakula | H02K 19/12 310/162 |
| 2010/0162720 A1 | 7/2010 | Bowman et al. | |
| 2010/0219786 A1* | 9/2010 | Eckerle | H02P 9/14 318/716 |
| 2010/0251726 A1 | 10/2010 | Jones et al. | |
| 2011/0181135 A1* | 7/2011 | Pollock | H02K 19/103 310/49.46 |
| 2011/0216449 A1* | 9/2011 | Reschovsky | H02H 9/00 361/18 |
| 2014/0125156 A1 | 5/2014 | Meeker | |
| 2014/0125157 A1* | 5/2014 | Kou | H02K 21/44 310/49.43 |

OTHER PUBLICATIONS

I. Boldea et al., "Automotive Electric Propulsion Systems With Reduced or No Permanent Magnets: An Overview", IEEE Transactions on Industrial Electronics, vol. 61, No. 10, pp. 5696-5711, Oct. 2014.

G. Pellegrino et al., "Comparison of Induction and PM Synchronous Motor Drives for EV Application Including Design Examples", IEEE Transactions on Industry Applications, vol. 48, No. 6, pp. 2322-2332, Nov./Dec. 2012.

Michel Platriic, Texas Instruments, Application Report SPRA494, "Implementation of Vector Control for PMSM Using the TMS320F240 DSP", Digital Signal Processing Solutions, Dec. 1998, 72 pages.

Arkkio, A. et al., "Induction and Permanent-Magnet Synchronous Machines for High Speed Applications", Proceedings of the Eighth International Conference on Electrical Machines and Systems, Sep. 29, 2005, pp. 871-876.

Cao, R. et al., "A Linear Doubly Salient Permanent-Magnet Motor With Modular and Complementary Structure", IEEE Transactions on Magnetics, Dec. 2011, pp. 4809-4821, vol. 47, No. 12.

S. Deaconu et al., "Mathematical Models and the Control of Homopolar and Homo-Heteropolar Reactive Synchronous Machines With Stator Excitation", Advances in Communications, Computers, Systems, Circuits and Devices, World Scientific and Engineering Academy and Society, 2010, pp. 78-83.

Liang, F., et al., "A New Variable Reluctance Motor Utilizing an Auxiliary Commutation Winding", IEEE Transactions on Industry Applications, Mar./Apr. 1994, pp. 423-432, vol. 30 No. 2.

K. Jash et al., "Vector Control of Permanent Magnet Synchronous Motor Based on Sinusoidal Pulse Width Modulated Inverter With Proportional Integral Controller", Int'l Journal of Engineering Research and Applications, Sep.-Oct. 2013, pp. 913-917, vol. 3, Issue 5.

P. Tsao, "An Integrated Flywheel Energy Storage System With a Homopolar Inductor Motor/Generator and High-Frequency Drive", Dissertation, Engineering-Electrical Engineering and Computer Sciences in the Graduate School of the University of California, Berkeley Fall, 2003, 158 pages.

\* cited by examiner

SERIES-WOUND HETEROPOLAR INDUCTOR MOTOR

RELATED APPLICATIONS

This application claims benefit of and priority to U.S. Provisional Application Ser. No. 62/133,659 filed Mar. 16, 2015, under 35 U.S.C. §§ 119, 120, 363, 365, and 37 C.F.R. § 1.55 and § 1.78, which is incorporated herein by this reference.

BACKGROUND OF THE INVENTION

Presently, the most widespread type of electric vehicle (EV) motor is an Interior Permanent Magnet (IPM) motor. This motor type has good power density, and the IPM's structure allows the motor to be operated in a constant-power "flux weakening" regime above the base speed (typically about 4000 RPM) up to the motor's maximum speed (typically about 10,000 RPM). However, permanent magnets are expensive, mechanically fragile, are damaged by high temperatures, and have previously faced supply problems. It is therefore desirable to have a motor that does not fundamentally depend on strong permanent magnets.

An alternative to IPM motors is the Induction Motor (IM) which has no permanent magnets. Induction motors are presently used by some electric vehicle vendors. The motors can be relatively power dense and can be readily operated with a reduced field above the motor's base speed. However, since high currents flow on the rotor, accommodation of rotor heating can be a design challenge. The power factor of an IM is also low relative to a PM machine.

Switched Reluctance Motors (SRMs) have sometimes been proposed for use in automotive applications. However, they have high torque ripple, and they are not very amenable to running in a field weakening mode. However, the SRM has a very simple construction that is inexpensive to build relative to other motor designs. Since all current flows on the stator, the machine is also relatively easy to cool.

Wound field heteropolar inductor machines have some of the attributes of an SRM (i.e., simple rotor), but they are potentially easier to control with a voltage source inverter because of their relatively sinusoidal back electromotive force (implying lower torque ripple). However, these machines have not been widely considered for automotive applications because they are viewed to have a very poor power factor. See I. Boldea et al., "*Automotive electric propulsion systems with reduced or no permanent magnets: an overview,*" IEEE Transactions on Industrial Electronics, 61(10):5695-5711, October 2014 incorporated herein by this reference.

BRIEF SUMMARY OF THE INVENTION

The invention provides a winding configuration and a method of control that enables a heteropolar inductor motor to operate as a high power density, non-permanent magnet electric drive system suitable for use in electric vehicles or as general purpose servomotors. The motor structure is preferably as described in U.S. patent application Ser. No. 13/849,760 (U.S. Publ. 2014/0125156) incorporated herein by this reference. Previously, a separate supply (field controller) was required for the field winding, the power factor for this type of machine was low, and operation in the high-speed/constant-power region (required for automotive applications) was not easily realized. To make the machine amenable to control with an automotive inverter and to eliminate the need for a separate field controller, the field winding is driven by a rectifier bridge attached in series to the phase windings (in lieu of connecting the phases together in a Y-configuration). Motor currents are then prescribed by a novel vector control method. Below the base speed, the method realizes the desired motor torque with high power factor. Above the base speed, the proposed method can produce constant power output accommodating inverter current and voltage limits.

Featured is an inductor motor comprising a rotor with teeth and no windings and a stator including teeth, three phase windings, and at least one field winding. An inverter drives the three phase windings. A three phase rectifier has an input connected to the phase windings and an output connected to the field winding.

The inverter is preferably configured, when the motor base speed is reached, to drive the three phase windings using changed phase angles to maintain constant power above the base speed. The rectifier may be configured to drive positive phase winding current through the field winding and then to the other phase windings carrying negative phase current which sink the phase winding current. In one design, each phase winding is connected between a pair of diodes in series and each pair of diodes is connected to one side of the field winding. The other side of the field winding is preferably connected to the first diode in each diode series pair. Further included may be a snubber circuit across the field winding to reduce any AC content of the current through the field winding. The motor snubber circuit may include a diode and/or a capacitor. The motor stator may have groups of teeth, each group having a field winding, and each tooth having a phase winding. In one preferred design, the rotor and stator teeth in adjacent groups are configured to be out of phase, the rotor and stator teeth configured such that opposite teeth on the rotor are aligned with one another and aligned with the teeth of opposite stator teeth field winding groups and, in an adjacent stator teeth field winding group, no rotor tooth is aligned with said stator phase. The rotor and stator may have an even number of teeth, the stator having more teeth than the rotor. The rotor may have ten teeth and the stator may have twelve teeth.

In one embodiment, four stator groups each have three teeth. Preferably, the rotor teeth are wider that the stator teeth. The spacing between adjacent stator teeth in a group may be equal and the spacing between adjacent groups is then equal but greater than the spacing between stator teeth in a group. The rotor teeth may be skewed. In one design, the rotor has ten teeth and the stator has twelve teeth having a 24° pitch arranged in groups, each group having a field winding, and each tooth having a phase winding. The pitch between stator teeth in adjacent groups may be larger than 24°.

Also featured is an inductor motor controller comprising a drive circuit connected to one side of the phase windings of the motor and a rectification circuit having an AC input connected to the other side of the phase windings and a DC output connected to a field winding(s) of the motor producing a DC current in the field winding(s) that is the same as or approximately the same as the phase current amplitude. The drive circuit may include an inverter and the rectification circuit may include a three phase rectifier.

Also featured is motor control method comprising driving the phase windings of the motor with an AC current, rectifying the AC current to produce a DC current delivered to a field winding(s) of the motor. When the motor base speed is reached the phase windings are driven using changed phase angles to maintain a constant power above the base speed.

The subject invention, however, in other embodiments, need not achieve all these objectives and the claims hereof should not be limited to structures or methods capable of achieving these objectives.

DETAILED DESCRIPTION OF THE INVENTION

Figure 1:
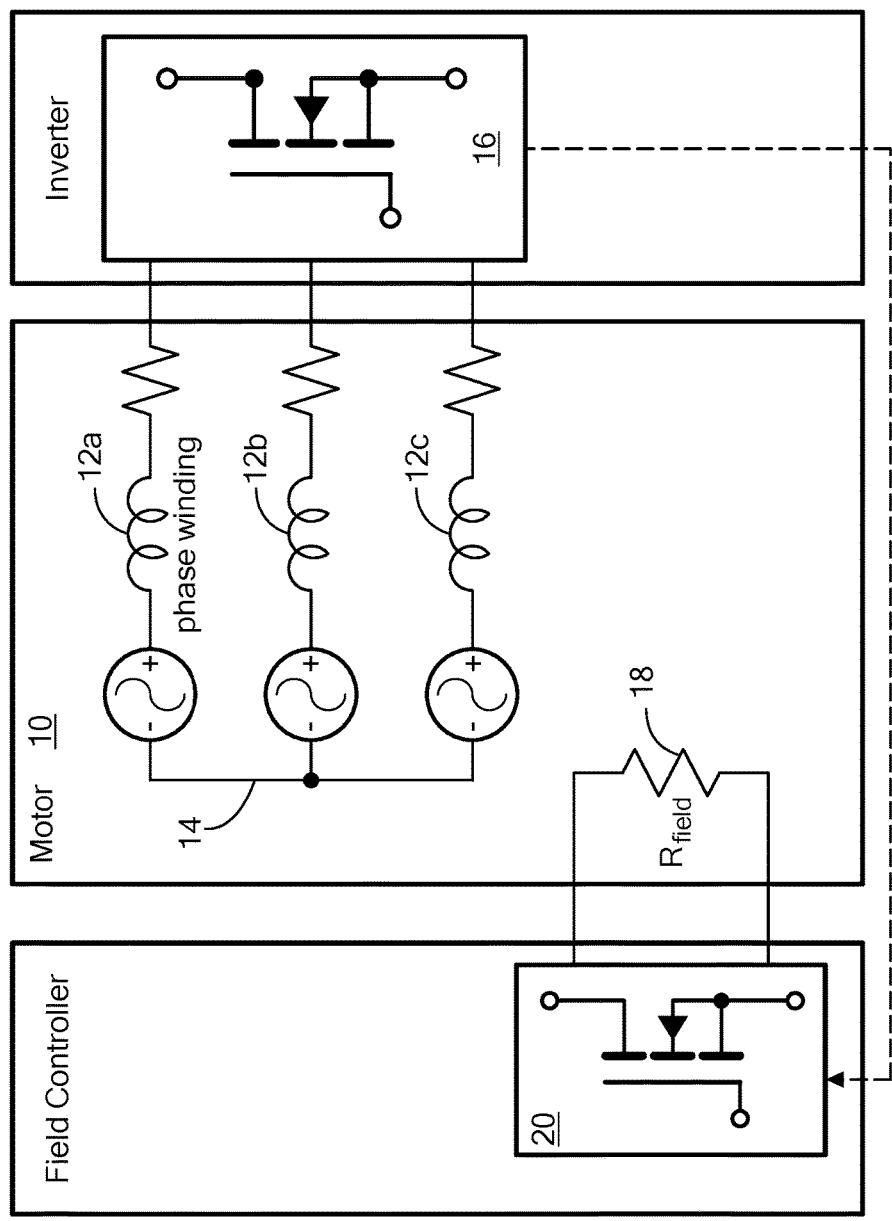
FIG. 1 is a circuit diagram showing a prior art inverter for driving the motor phase windings and a field controller for the motor field winding(s)

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

In the prior art, motor 10 with phase windings 12a, 12b, and 12c were connected as shown at 14 and driven by inverter 16 while field winding 18 was driven by field controller 20 commanded by a field current command from inverter 16 as shown at 22.

Figure 2:
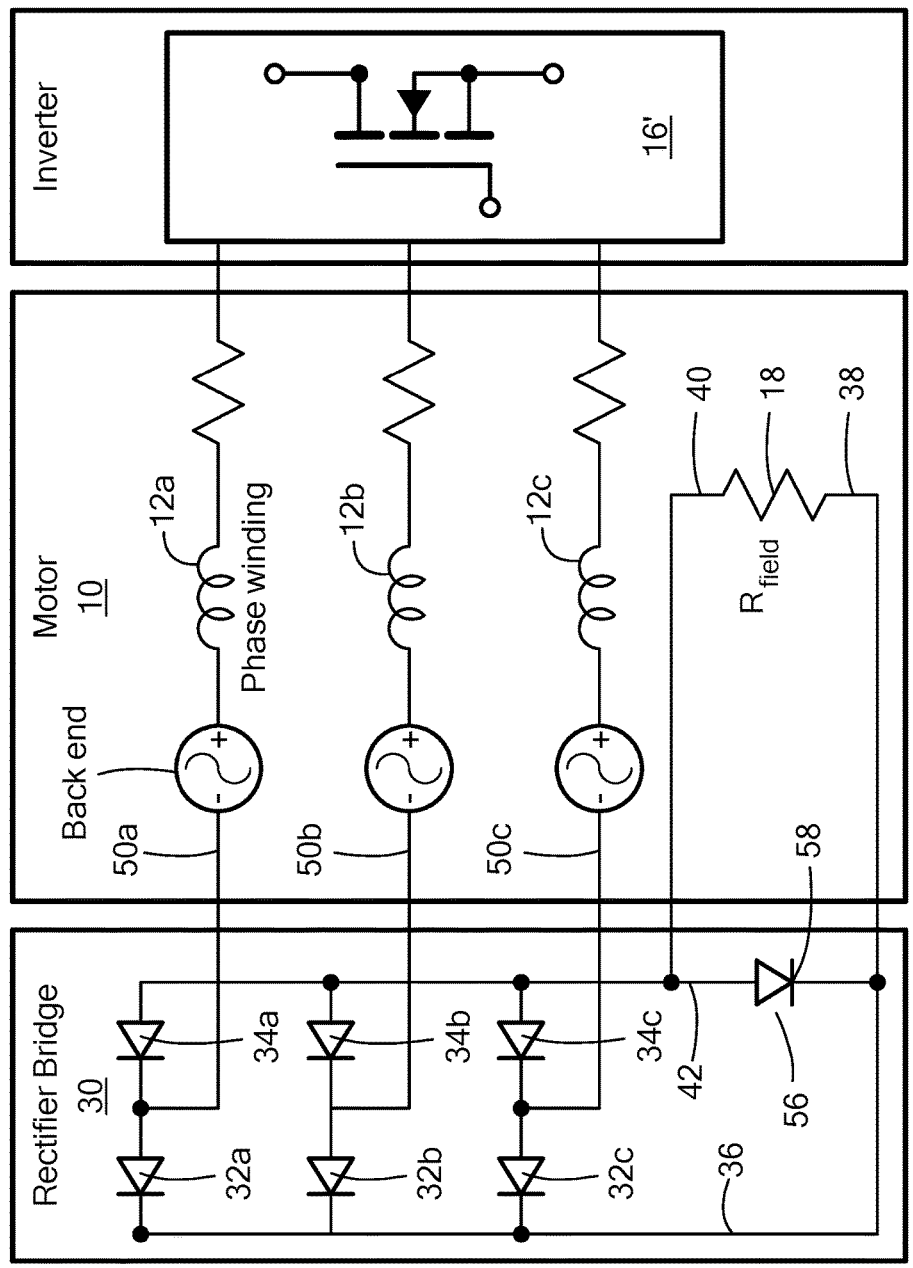
FIG. 2 is a circuit diagram showing the primary components associated with a preferred motor controller where an inverter drives the motor phase windings and a rectifier bridge circuit has an input connected to the three phase windings and its output connected to the field winding(s)

As shown in FIG. 2, induction motor 10 phase windings 12a, 12b, and 12c are driven by a drive circuit such as inverter 16' but exemplary control circuit 30, here a three phase bridge rectifier, has its AC input connected to the three phase windings 12a, 12b, and 12c and its DC output connected to field winding(s) 18.

In the preferred design shown, each phase winding 12 is connected between a pair of diodes in series (e.g., diode pair 32a, 34a, for phase winding 12a). Each diode series pair output is connected via line 36 to one side 38 of field winding 18. The other side 40 of field winding 18 is connected to the input of first diode 34a, 34b, 34c in each series pair via line 42. In this way, rectifier 30 drives positive phase winding current through the field winding(s) and then to the other phase windings with negative phase current which sink the current. For example, if one amp of current from phase winding 12a proceeds on line 50a through diode 32a and then to side 38 of field winding 18, 0.5 amps will proceed on line 42 through diodes 34b and 34c and line 50b and 50c as phase windings 12b and 12c sink said current. In general, then, phases with a positive instantaneous phase current provide the source of the current that goes to the field winding, and the phases with a negative instantaneous phase current sink the current coming out of the field winding.

Further included may be a snubber circuit 56 preferably including diode 58 across field winding 18 to reduce or eliminate any AC content of the current through the field winding. A compactor may be located in parallel with the diode.

Figure 3:
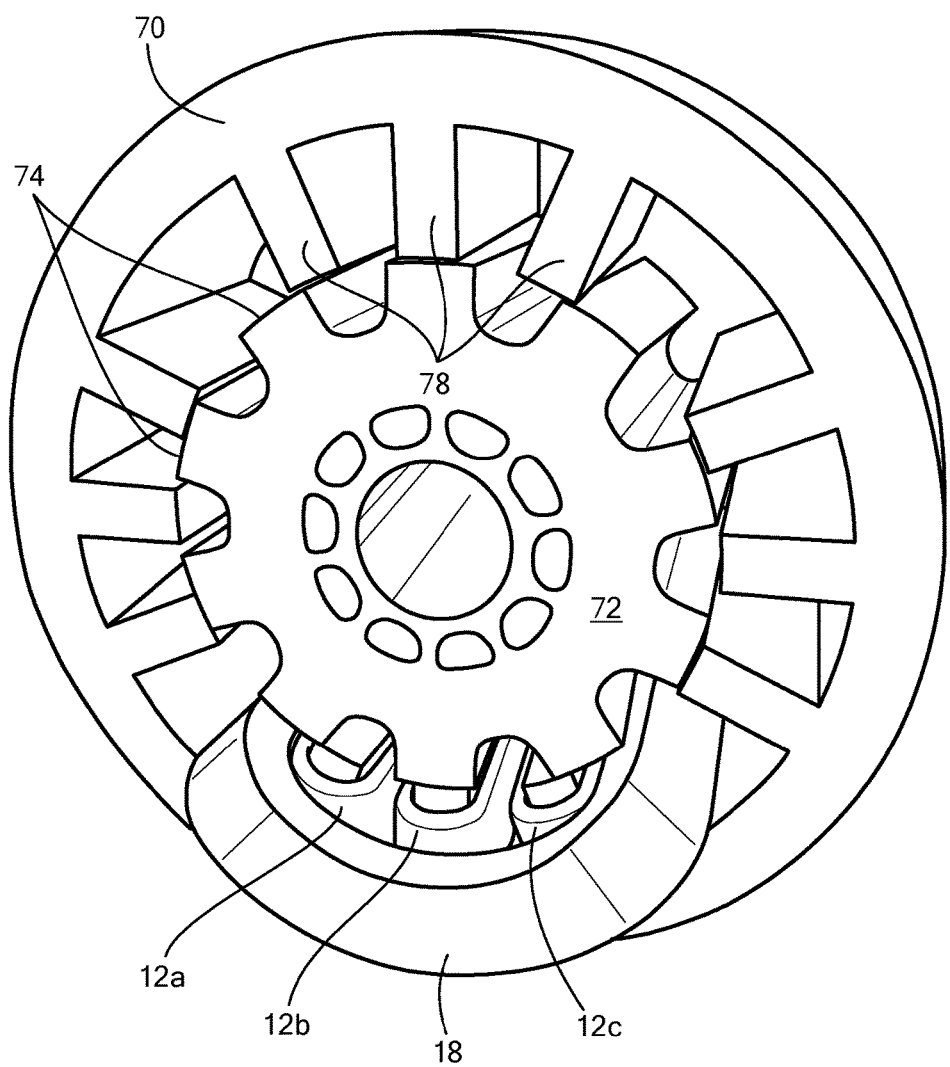
FIG. 3 is a schematic view showing an example of a motor controlled by the circuitry of FIG. 2.
Figure 4:
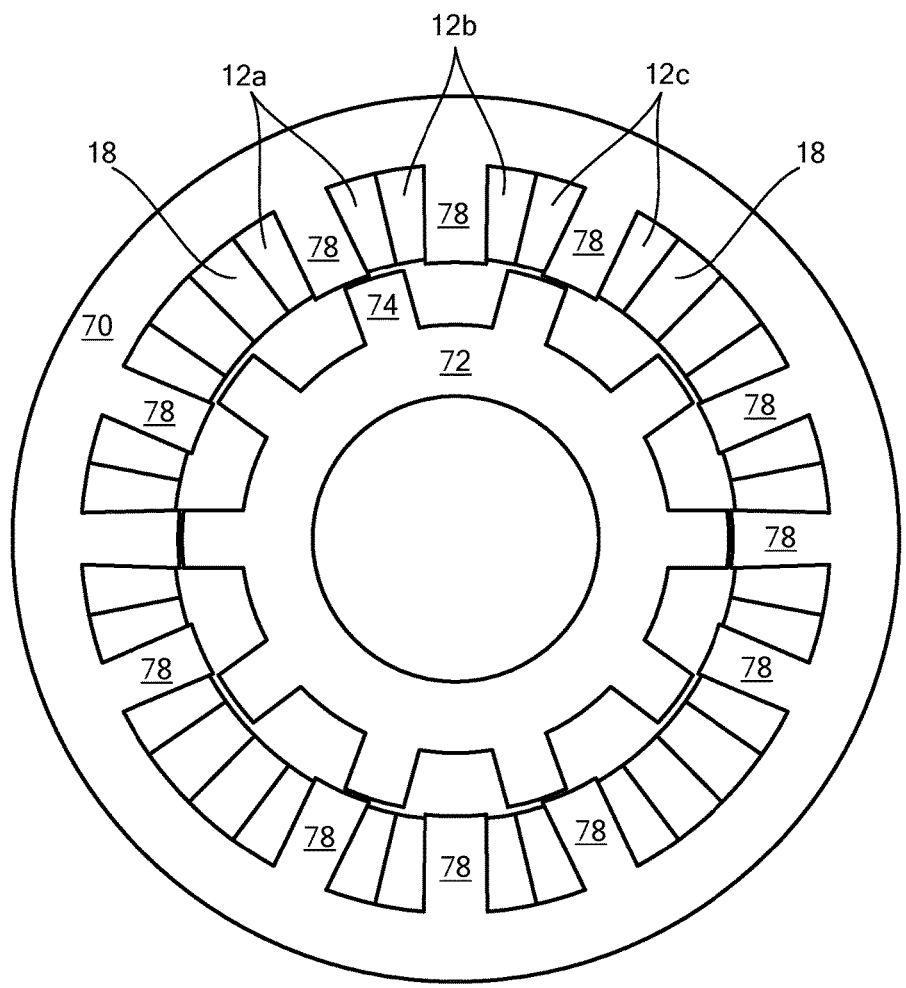
FIG. 4 is a cross-sectional view of the motor of FIG. 3.

Preferably, such a circuit applies to heteropolar inductor motors, typified by the Doubly Salient Synchronous Machine (DSSM) described in U.S. patent application Ser. No. 13/849,760 (incorporated herein by this reference) as shown in FIGS. 3 and 4. The parameters of a specific machine design sized for an electric vehicle application are detailed in Table 1:

TABLE 1

Parameters of a 50 hp DSSM intended for automotive applications.

| Parameter | Units | DSSM |
|---|---|---|
| Pole Pairs | | 10 (effective) |
| Stator Teeth | | 12 |
| Stator OD | mm | |
| Stator Bore Dia. | mm | 134.5 |
| Stack Length | mm | |
| Air Gap | mm | 0.5 |
| Number of Turns | | 7 (field coils) |
| | | 10 (phase coils) |
| Copper fill factor | | 0.55 (field) |
| | | 0.5 (phase) |
| End Connections (per side) | mm | 150 (field) |
| | | 35 (phase) |
| Max Speed | rpm | 12,000 |
| Continuous Torque | N*m | 120 |
| (@ 3.2 kW dissipation) | | |
| Speed at Continuous Torque | rpm | 3800 |
| Current at Continuous Torque | $A_{pk}$ | 200 |
| Maximum Speed | rpm | |
| (@ 3.2 kW dissipation) | | |
| Overload Torque | N*m | 175 |
| Overload Current | $A_{pk}$ | 360 |
| Rated Phase Voltage | $V_{pk}$ | 173 |
| Phase Back-EMF | $V_{pk}$ | N/A |
| (12,000 rpm, 20° C.) | | |
| Stator Resistance (130° C.) | Ω | 0.0405 (field) |
| | | 0.0182 (phase) |
| Rotor Resistance (180° C.) | Ω | N/A |
| Steel Grade | | DI-MAX HF-10 |
| PM Grade | | N/A |
| PM Mass | kg | N/A |
| Rotor Temperature | ° C. | 150 |

The parameters in Table 1 were selected to yield an EV motor whose performance is directly comparable to the IPM and IM designs considered in G. Pellegrino et al., "*Comparison of induction and PM synchronous motor drives for EV applications including design examples.*" *IEEE Transactions on Industry Applications*, 48(6):2322-2332, November/December 2012, incorporated herein by this reference.

The motor has three-phase windings 12 that carry AC current and a DC field winding 18 on the stator 70. The rotor 72 includes of a toothed stack of laminations, preferably with a 6° skew over the length of the rotor stack. Flux switching of the field produced by the DC field coil 18 due to the spinning of the rotor produces an AC voltage in the phase coils 12. Another machine of the same class (heteropolar inductor motor) is described in U.S. Pat. No. 6,075,302 incorporated herein by this reference. The technique could also be applied to homopolar inductor motors, such as those described in P. Tsao, "*An integrated flywheel energy storage system with a homopolar inductor motor/generator and high-frequency drive*," Ph.D. dissertation, UC Berkley Department of Electrical Engineering and Computer Science, 2003 and S. Deaconu et al., "*Mathematical models and the control of homopolar and homo-heteropolar reactive synchronous machines with stator excitation*", Advances in Communications, Computers, Systems, Circuits and Devices, World Scientific and Engineering Academy and Society, 2010 (both incorporated herein by reference) because they have a topologically similar construction (field winding and phase winding on the stator, simple toothed rotor).

The present invention connects the windings together in a novel fashion. The three motor phases 12 are terminated into a rectifier bridge 30, FIG. 2 driving the field winding(s) 18. The rectifier circuit 30 produces a DC current in the field winding 18 that is approximately the same as the phase current amplitude. Thus, no additional active electronics are needed to supply field current.

In one preferred design as shown in FIGS. 3 and 4, the rotor 72 with teeth 74 has no windings and the stator 70 includes teeth 78, three phase windings 12, and at least one field winding 18. Additional field windings can be all interconnected. As shown in FIG. 2, the inverter 16' drives the three phase windings 12. The three phase rectifier 30 has its input connected to the three phase windings 12 and its output connected to the field winding 18. Also, as discussed below, the inverter 16' is preferably configured, when the base speed is reached, to drive the three phase windings using changed phase angles to maintain constant power above the base speed.

The motor can be controlled by selecting the Field Current ($i_f$) and phase angle φ. These control parameters map onto the commanded phase currents using the formulas:

$$i_d = -i_f \cos \varphi \quad (1)$$

$$i_q = i_f \sin \varphi \quad (2)$$

These phase currents are realized via a voltage source inverter running in closed-loop current mode. Currents $i_d$ and $i_q$ represent currents in a direct/quadrature reference frame fixed with the rotor. In this case, the scaling of $i_d$ and $i_q$ is selected so that the peak phase current is equal in amplitude to $i_f$ (i.e., scaled to peak current). Also note that the negative sign on $i_d$ means that $I_d$ tends buck the flux from the field coils. At the base speed and below, a combination of good power factor and efficiency is achieved with the by selecting φ to be a constant angle of 60° and selecting the field current to be that which is needed to produce the desired torque.

Figure 5:
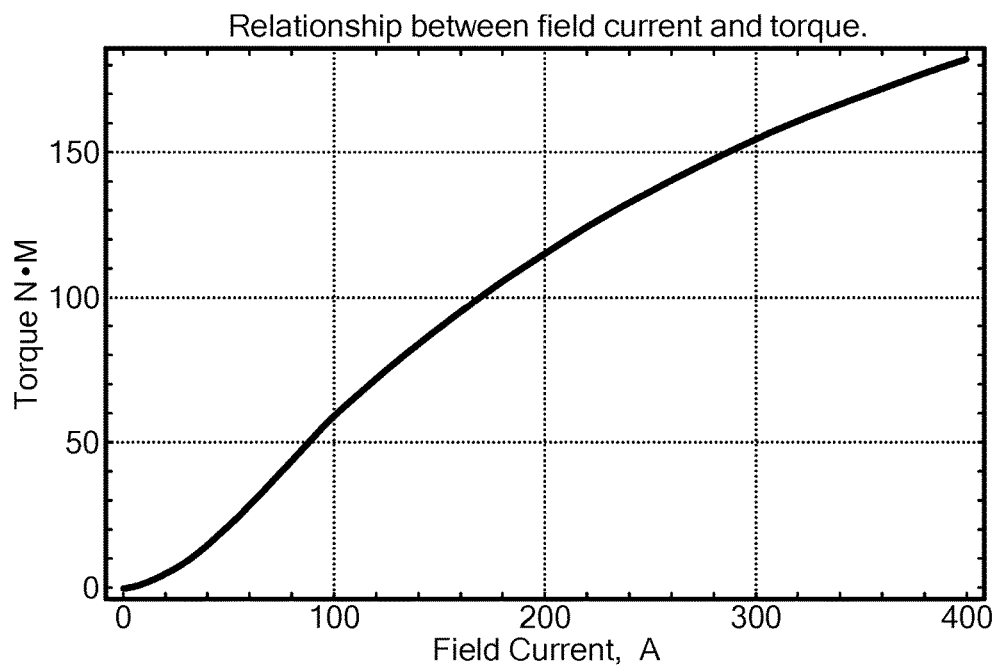
FIG. 5 is a graph showing torque versus field current for the motor control circuit of FIG. 2.

The machine typically runs in a highly saturated regime—finite element analysis is used to map out the relationship between $i_f$ and torque at a constant φ. For a typical machine (e.g. the 50 kW machine defined by the parameters in Table 1), the field current-to-force graph looks as shown in FIG. 5. Note that rather than having a quadratic form (which would be expected in a machine with the materials operating in a linear region), the form of the curve is nearly linear (i.e. because the material in the teeth is highly saturated).

Figure 6:
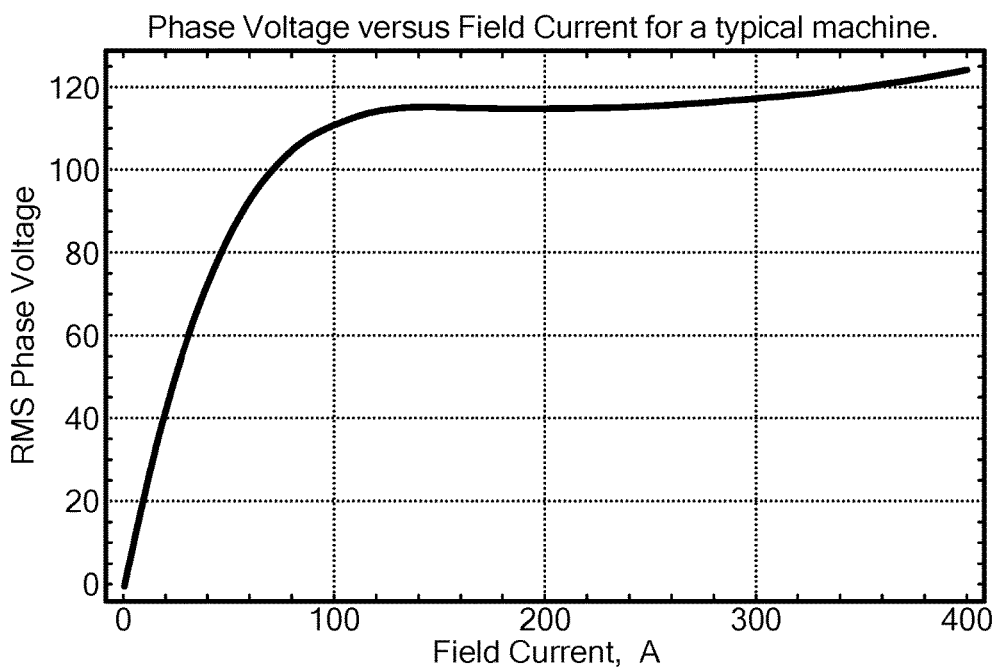
FIG. 6 is a graph showing the RMS phase voltage versus field current.
Figure 7:
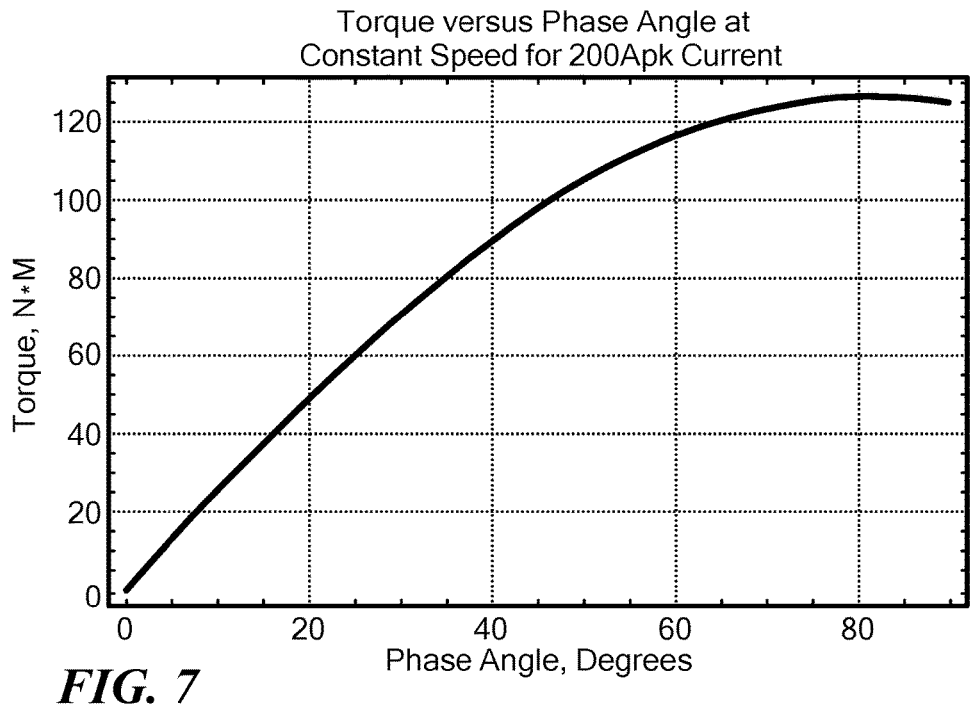
FIG. 7 is a graph showing torque versus phase angle.
Figure 8:
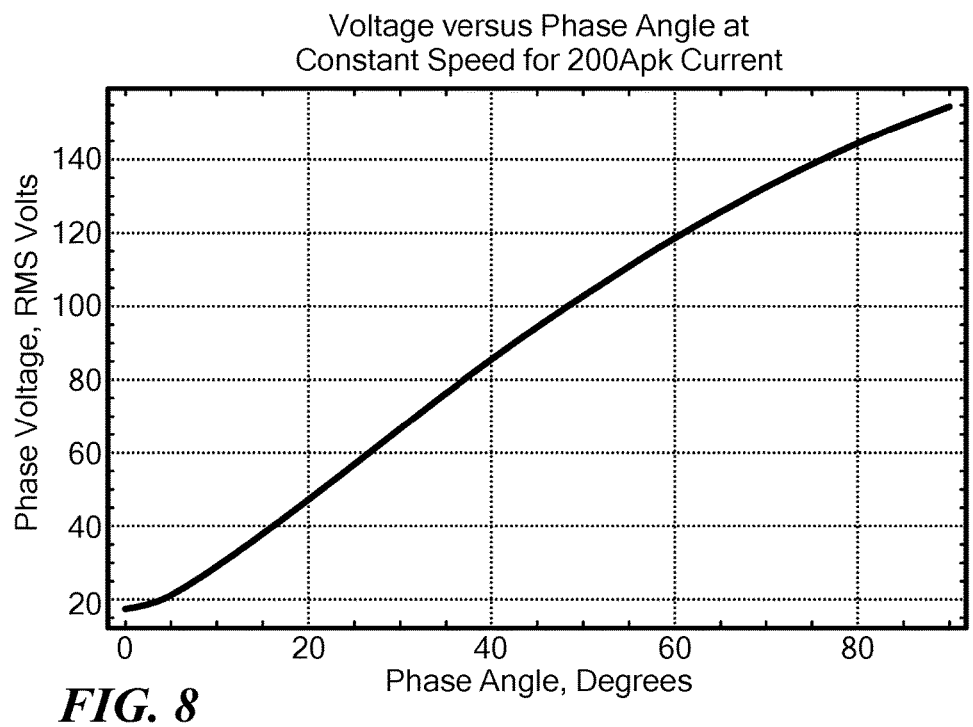
FIG. 8 is a graph showing phase voltage versus phase angle.
Figure 9:
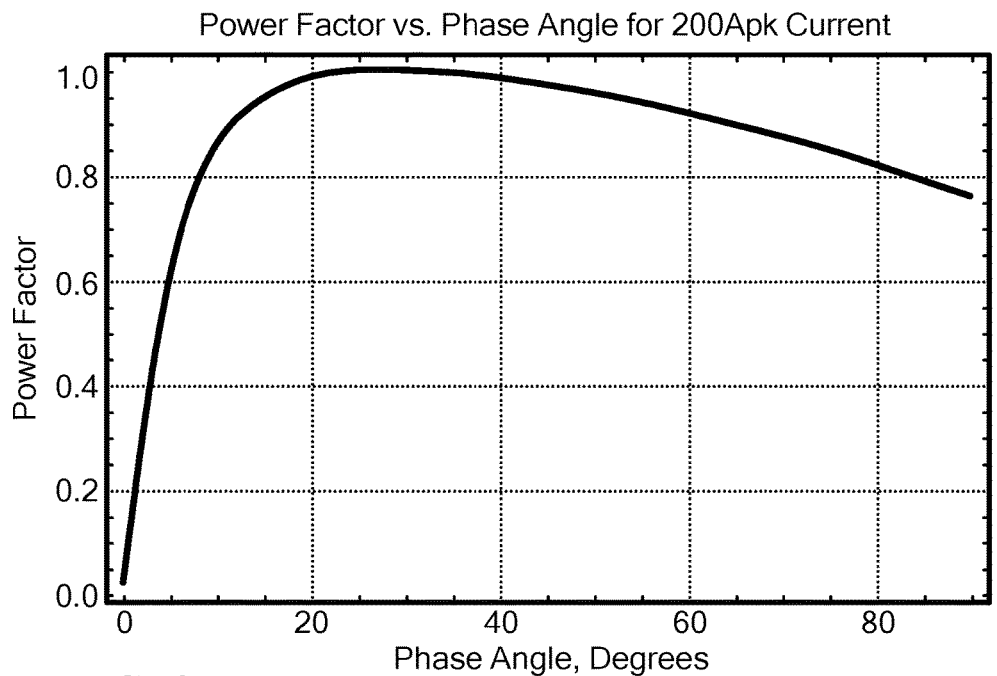
FIG. 9 is a graph showing power factor versus phase angle.

The finite element analysis shows that the required phase voltage is nearly flat versus field current level, as shown in FIG. 6. This implies that the incremental inductance of the machine is low, and that good transient performance might be achieved with the machine.

Note that to achieve the desired field weakening performance, the number of turns in the field coil has to be selected so that the peak power factor (ideally, PF=1) occurs at 45°, essentially in the middle of the field weakening range. This condition is realized if each field coil has approximately sqrt(2) times the number of turns as each phase coil for the DSSM-type machine.

Preferably, the machine is meant to be controlled using inverter 16', FIG. 2. The inverter is preferably configurable, for example, it includes a processor which can be programmed. An example is the C2000 Piccolo Launch Pad (Texas Instruments). The method of control implemented in the processor is similar to Permanent Magnet Synchronous Motors. These motors are often controlled using an approach called "Field Oriented Control" (FOC). A typical implementation of FOC is described in K. Jash, et al., "Vector control of permanent magnet synchronous motor based on sinusoidal pulse width modulated inverter with proportional integral controller", Int. Journal of Engineering Research and Applications, 3(5):913-917, September-October 2013. http://citeseerx.ist.psu.edu/viewdoc/download?doi-10.1.1.432.7838&rep-rep1&type-pdf However, there are differences in the control of the present class of machines relative to the control of PM machine, especially for its control at high speeds. Exemplary pseudocode for the processor of inverter 16' is as follows. The transformation between the phase current reference frame and the field-oriented reference frame is:

$$\begin{Bmatrix} i_d \\ i_q \end{Bmatrix} = \frac{2}{3} \begin{bmatrix} \cos\varepsilon & \cos(\varepsilon - 2\pi/3) & \cos(\varepsilon + 2\pi/3) \\ -\sin\varepsilon & -\sin(\varepsilon - 2\pi/3) & -\sin(\varepsilon + 2\pi/3) \end{bmatrix} \begin{Bmatrix} i_a \\ i_b \\ i_c \end{Bmatrix} \quad (7)$$

where $i_d$ and $i_q$ are the Direct and Quadrature axis currents in a reference frame aligned with the rotor magnets; $i_a$, $i_b$, and $i_c$ represent the instantaneous current in each phase; and ε is an angle denoting the angular shift between the stator-fixed and rotor-fixed reference frames.

The inverse transformation from D-Q currents back to phase currents is:

$$\begin{Bmatrix} i_a \\ i_b \\ i_c \end{Bmatrix} = \begin{bmatrix} \cos\varepsilon & -\sin\varepsilon \\ \cos(\varepsilon - 2\pi/3) & -\sin(\varepsilon - 2\pi/3) \\ \cos(\varepsilon + 2\pi/3) & -\sin(\varepsilon + 2\pi/3) \end{bmatrix} \begin{Bmatrix} i_d \\ i_q \end{Bmatrix} \quad (8)$$

It can be noted that in this choice of scaling, the amplitude of any one of the phase currents is equal to sqrt($i_d^2 + i_q^2$).

For a typical surface-mount permanent magnet machine, $$\tau = -k_i \{ \sin\varepsilon \quad -\sin(\varepsilon - 2\pi/3) \quad -\sin(\varepsilon + 2\pi/3) \} \begin{Bmatrix} i_a \\ i_b \\ i_c \end{Bmatrix} \quad (9)$$

where $k_i$ is a constant relating the phase current to torque.

The point of performing the D-Q transformation is that when the D-Q current definition is substituted for the phase currents, the torque expression (where torque is denoted as τ) simplifies to:

$$\tau = 3/2 k_i i_q \quad (10)$$

The simplified form gets rid of all angular dependence, and torque is simply proportional to the Q-axis part of the current.

Under normal, low-speed, operating conditions, the inverter is then controlled so that:

$$i_d = 0 \quad (11)$$

(because the Direct axis component of the current produces no torque) and so that $$i_q = \frac{2}{3} \frac{\tau_{des}}{k_i} \quad (12)$$

where $\tau_{des}$ is the desired torque.

The Series-Wound Heteropolar Inductor Machine is not a permanent magnet machine, but a similar transformation to D- and Q-axis currents can be performed for the Series-Wound Heterpolar Inductor machine. Under typical operating conditions, the machine in question also has a similar linear relationship between current and torque.

Due to the action of the rectifier 30, FIG. 2, the field current is approximately the same as the amplitude of the phase current. With this choice of scaling, $$i_f = \sqrt{i_d^2 + i_q^2} \quad (13)$$

Unlike a surface-mount permanent magnet machine, some D-axis current is desired at all times so that the machine can be run in a high power factor condition. Furthermore, under typical operating conditions, the machine experiences significant magnetic saturation. Because of the saturation, the relationship between field current (at a particular $i_q/i_d$ ratio) and torque is approximately linear. Assuming this approximately linear relationship between current and torque, the algorithm for picking the motor currents $i_d$ and $i_q$ that are needed to realize torque $\tau_{des}$ at motor speed Ω is:

Define the following constant values:

$\tau_o$ is the "Base Torque". The Base Torque is the maximum continuous torque that can be produced at the machine's nominal operating speed $\Omega_o$ is the "Base Speed". The Base Speed is the machine's nominal operating speed and the highest speed that can be achieved without using "field weakening" to accommodate drive voltage.

$i_{fo}$ is the "Base Field Current". This is the field current that is required to make the Base Torque at the Base Speed.

$\varphi_o$ is an angle defining the split between D- and Q-axis currents at the Base torque and speed.

$\varphi_{max}$ is the upper bound on the angle defining the split between D- and Q-axis currents. This bound is engaged at or below the base speed.

$\varphi_{min}$ is the lower bound on the angle defining the split between D- and Q-axis currents. This bound is approached when the machine's speed is high.

$$\tau_{lim} = \tau_o * \min\left(1, \left|\frac{\Omega_o}{\Omega}\right|\right) \quad (14)$$

$$i_f = i_{fo}\left(\frac{\tau_{des}}{\tau_{lim}}\right) \quad (15)$$

$$\varphi = \min\left(\varphi_{max}, \varphi_{min} + (\varphi_o - \varphi_{min})\left(\frac{\Omega_o}{\Omega}\right)^2\right) \quad (16)$$

$$i_d = -|i_f|\cos\varphi \quad (17)$$

$$i_q = i_f \sin\varphi \quad (18)$$

In the algorithm, $\tau_{lim}$ represents the largest torque that can be produced at speed Ω. The maximum torque scales with the inverse of rotor speed above base speed $\Omega_o$.

Phase angle φ can also be defined as $$\varphi = \arctan\left|\frac{i_q}{i_d}\right|.$$

The angle essentially denotes how current is split between the D- and Q-axes.

At $\tau_{lim}$, the field current is the same as the Base Field Current, $i_{fo}$, so that in the field-weakening region of operation (at speeds greater than the base speed), current limits are accommodated.

As speed increases, phase angle φ gets smaller, increasing the $i_d$ that counteracts field current, bucking the magnetic field in the machine and accommodating voltage limits.

The selections of the $\varphi_o$ and $\varphi_{min}$ parameters are meant to provide a high power factor both at and above the base speed.

For example, a particular motor is designed to deliver 20 hp continuously at 3600 RPM.

$\tau_o$=40 N*m
$i_{fo}$=61 A
$\Omega_o$=3600 RPM
$\varphi_o$=60°
$\varphi_{max}$=60°
$\varphi_{min}$=12°

Figure 10:
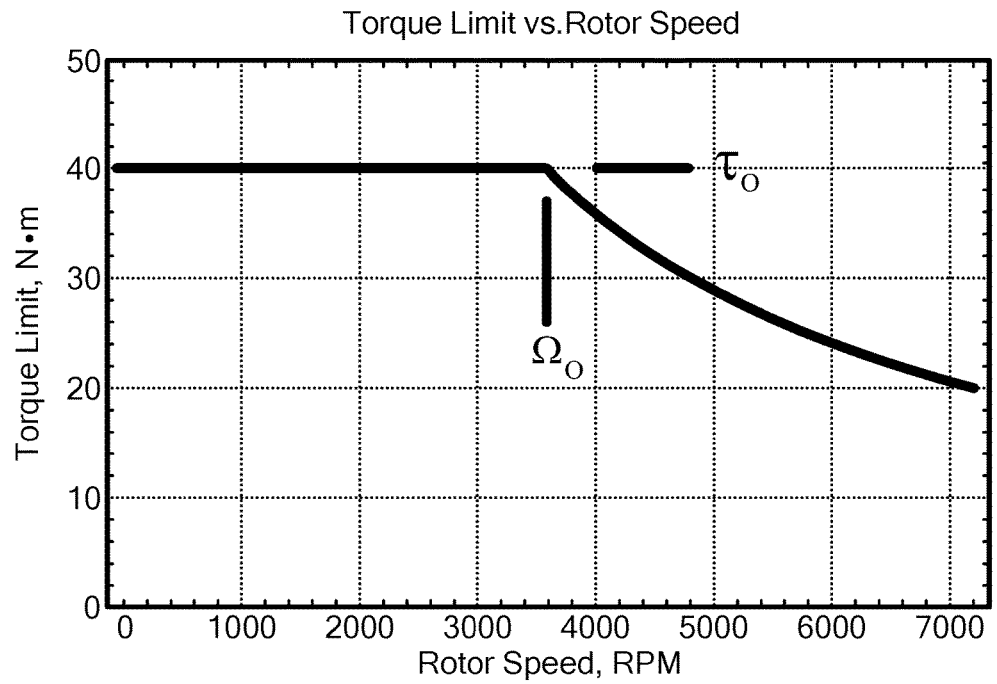
FIG. 10 is a graph showing the torque limit versus rotor speed.
Figure 11:
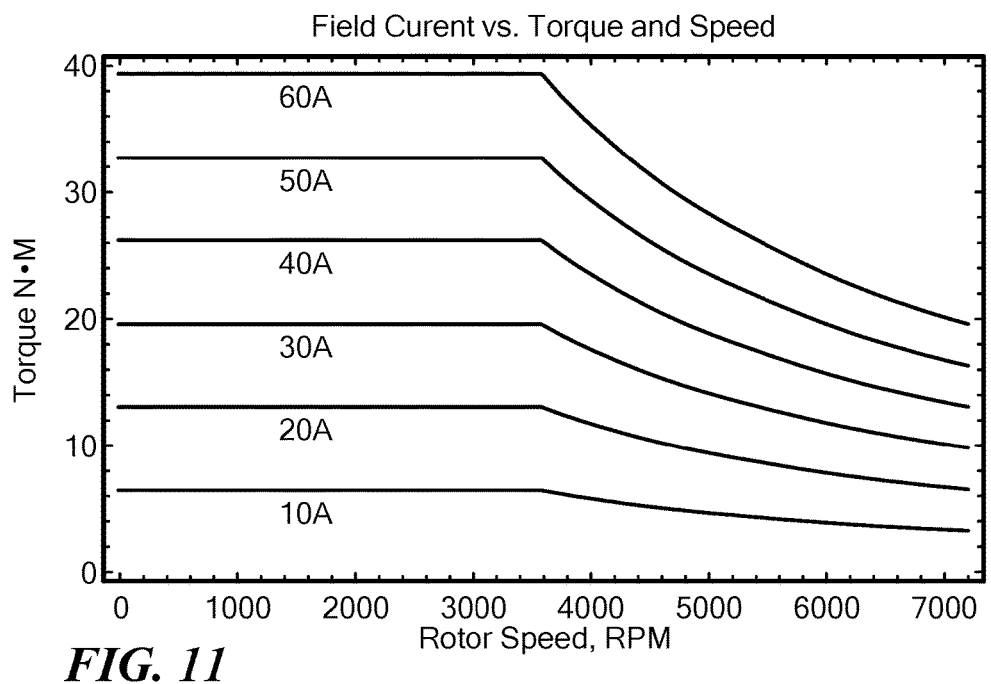
FIG. 11 is a graph showing field current versus torque and rotor speed.
Figure 12:
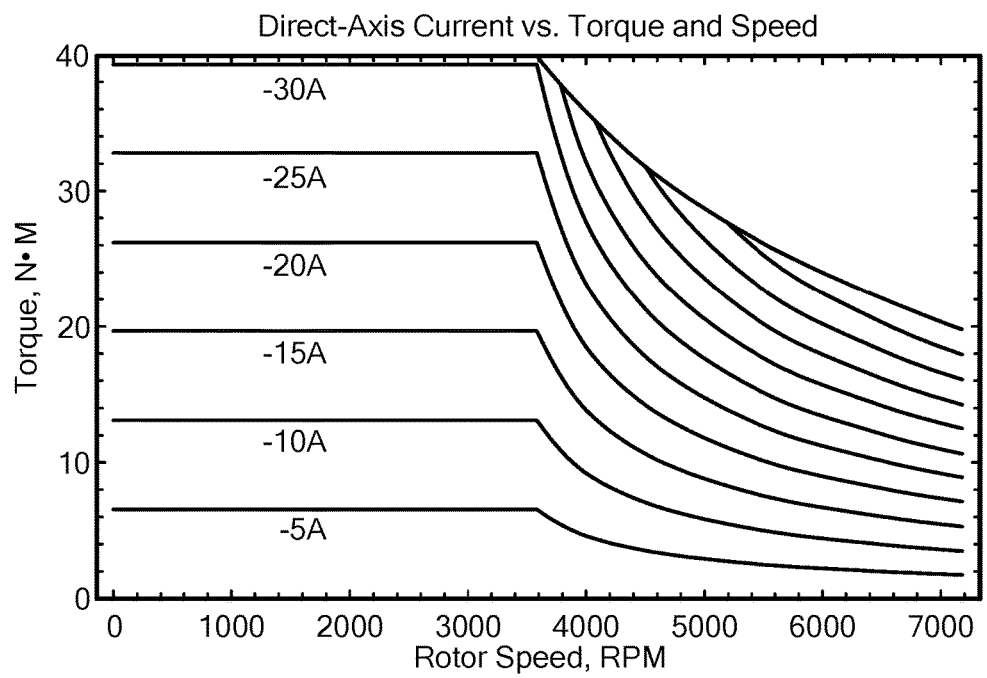
FIG. 12 is a graph showing direct axis current versus torque and speed.
Figure 13:
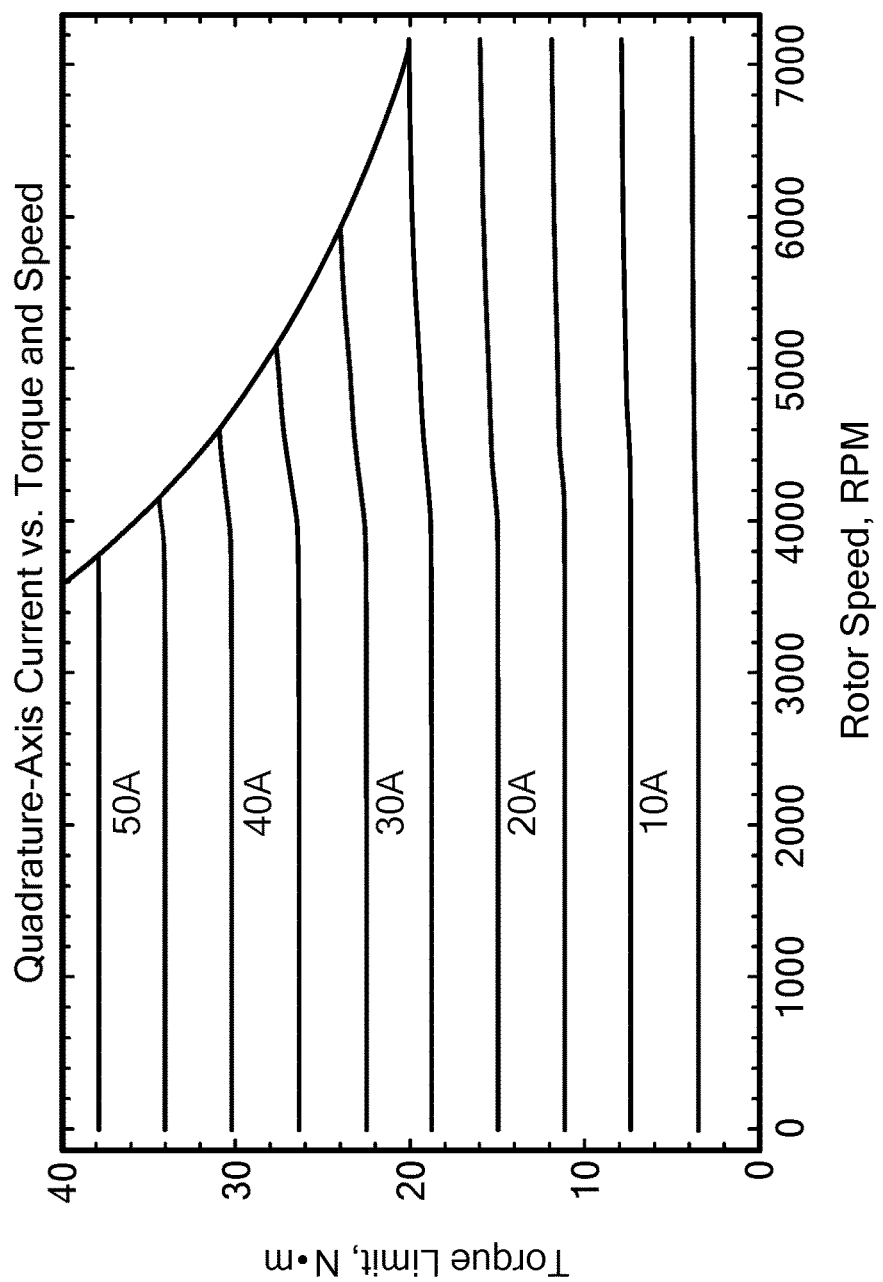
FIG. 13 is a graph showing quadrature axis current versus torque and speed.

The $\tau_{lim}$ vs. speed is shown as FIG. 10. The field current versus torque and speed is shown as FIG. 11. The $i_d$ and $i_q$ versus torque and speed are shown in FIGS. 12 and 13, respectively. The magnitude of the D-axis current increases above the base speed, whereas the Q-axis current remains approximately the same for a given torque both above and below the base speed.

In the algorithm implemented in inverter 16', FIG. 2 currents are specified to realize a desired torque with the Series Wound Heteropolar Inductor alternator. The algorithm uses reference frame theory that is related to the approaches used for Permanent Magnet Synchronous Motors, but there are differences in the algorithm from the Permanent Magnet version that are driven by the need to maintain good power factor in the present machine. Instead, permanent magnet machines typically run a scheme with $i_d$=0 up to the base speed and then apply a negative $i_d$ current to maintain a constant voltage demand. In contrast, the present scheme uses some negative $i_d$ current all the time to maintain good power factor, increasing the amplitude of $i_d$ (making $i_d$ more negative) at speeds above the base speed.

Preferably the motor, FIGS. 3-4 employs a 10-toothed rotor 72 built out of laminated iron. There are typically no windings on the rotor. The machine may have a 12-toothed stator 70. The stator teeth are shown segregated in four quadrants. Each quadrant has three teeth, each wrapped with a coil from a single phase. All three teeth in a quadrant are wrapped by a stationary field winding 18. A coil from a single phase is wound around each tooth and a stationary field coil encircles every three stator teeth. This machine gives the advantages of a wound-field generator (i.e., easy-to-regulate output voltage, simple power conditioning electronics, sinusoidal output voltage) with that of a Switched Reluctance machine (simple, robust construction, concentrated stator windings, no brushes or exciter required). The machine may be appropriate for high-speed generating applications such as a direct-drive alternator attached to a gas turbine engine. The machine also may be appropriate as a motor for electric vehicle applications where field weakening is needed at high speeds and simple machines without rare earth magnets are needed to obtain low cost.

Unlike typical SRMs, the rotor teeth may be wider than the stator teeth. The rotor teeth are also skewed over the length of the rotor, typically by 6 degrees to reduce cogging torque and to facilitate production of a more sinusoidal Back Electromotive Force (BEMF).

The rotor teeth are fatter than the stator teeth, the rotor is skewed, and the teeth in top and bottom quadrants are out of phase with the left and right quadrants. This combination results in a net flux linkage for each phase that is symmetric about zero and close to sinusoidal in shape. Consequently, the BEMF waveform of the line-to-line voltage is nearly sinusoidal as well.

10 rotor teeth, 12 stator teeth grouped into "quadrants" with 24 degree tooth pitch, and a skewed rotor allow the machine to retain the advantages of the SRM: a simple laminated rotor structure and concentrated winding for simplicity and good heat flow.

The invention also mitigates shortcomings of the SRM design in that the proposed design does not require complicated drive electronics to act as a generator. The sinusoidal BEMF and output voltage that can be easily regulated via the field winding allow a simple/light rectifier bridge to be used as the associated generator power electronics. Torque ripple is not high. Choice of relative tooth widths and rotor tooth skew reduces torque ripple versus SRM/Doubly Salient machines. The power density of the machine is about the same as a SRM machine.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. An inductor motor comprising:
   a rotor with teeth and no windings;
   a stator including teeth, three phase windings, and at least one field winding;
   the rotor and stator teeth in adjacent groups configured to be out of phase, the rotor and stator teeth configured such that opposite teeth on the rotor are aligned with one another and aligned with the teeth of opposite stator teeth field winding groups and, in an adjacent stator teeth field winding group, no rotor tooth is aligned with said stator phase;
   an inverter driving the three phase windings; and
   a three phase rectifier having an input connected to the phase windings and an output connected to the field winding.

2. The motor of claim 1 in which the inverter is configured, when the motor base speed is reached, to drive the three phase windings using changed phase angles to maintain constant power above the base speed.

3. The motor of claim 1 in which the rectifier is configured to drive positive phase winding current through the field winding and then to the other phase windings carrying negative phase current which sink the phase winding current.

4. The motor of claim 3 in which each phase winding is connected between a pair of diodes in series and each pair of diodes is connected to one side of the field winding.

5. The motor of claim 4 in which the other side of the field winding is connected to the first diode in each diode series pair.

6. The motor of claim 5 further including a snubber circuit across the field winding to reduce any AC content of the current through the field winding.

7. The motor of claim 6 in which the snubber circuit includes a diode.

8. The motor of claim 1 in which the stator has groups of teeth, each group having a field winding, each tooth having a phase winding.

9. The motor of claim 8 in which the rotor and stator have an even number of teeth, the stator having more teeth than the rotor.

10. The motor of claim 9 in which the rotor has ten teeth and the stator has twelve teeth.

11. The motor of claim 9 in which each stator group has three teeth with four said groups.

12. The motor of claim 1 in which the rotor teeth are wider that the stator teeth.

13. The motor of claim 1 in which the spacing between adjacent stator teeth in a group is equal and the spacing between adjacent groups is equal but greater than the spacing between stator teeth in a group.

14. The motor of claim 1 in which the rotor teeth are skewed.

15. The motor of claim 1 in which the rotor has ten teeth and the stator has twelve teeth having a 24° pitch arranged in groups, each group having a field winding, and each tooth having a phase winding.

16. The motor of claim 15 in which the pitch between stator teeth in adjacent groups is larger than 24°.

17. The motor of claim 15 in which each stator group has three teeth with four said groups.

* * * * *